T. OLINGER.
DAMPER CONSTRUCTION.
APPLICATION FILED AUG. 11, 1921.
1,398,038.
Patented Nov. 22, 1921.
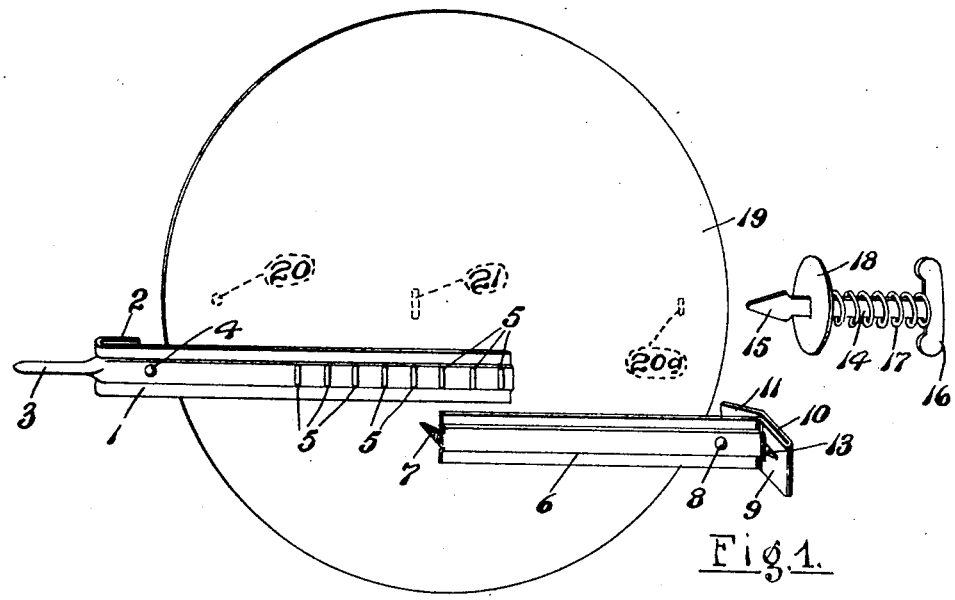
Fig.1.
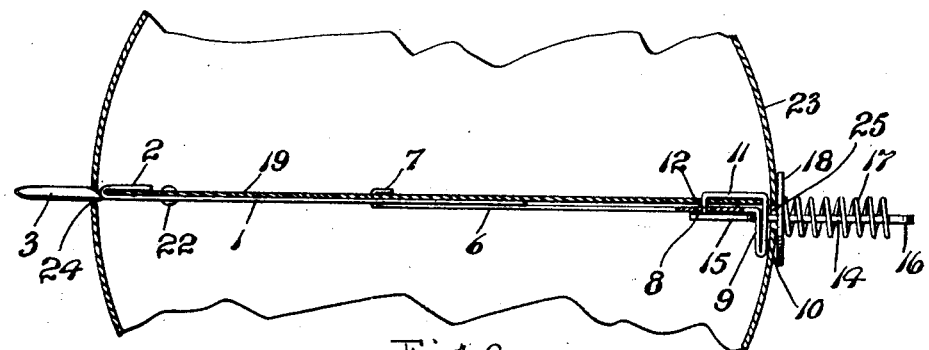
Fig.2.
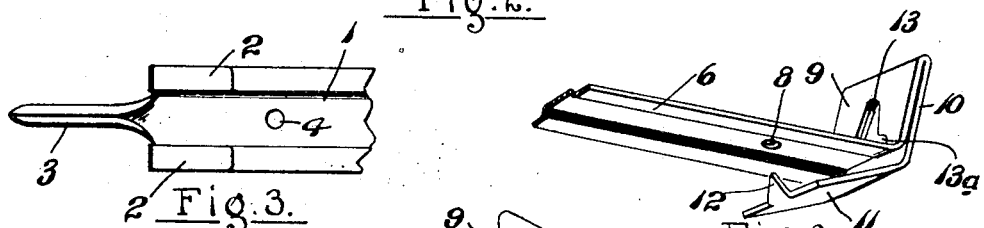
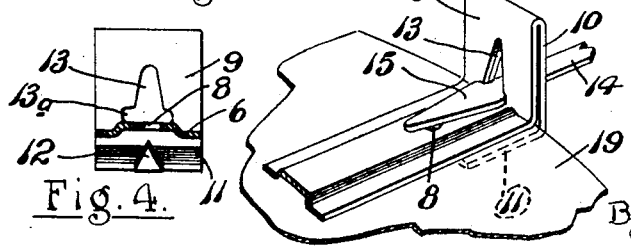
Inventor
Thomas Olinger
By Frank E. Liverance, Jr.
Attorney

UNITED STATES PATENT OFFICE.

THOMAS OLINGER, OF HOLLAND, MICHIGAN, ASSIGNOR TO FEDERAL STAMPING COMPANY, OF HOLLAND, MICHIGAN, A CORPORATION OF MICHIGAN.

DAMPER CONSTRUCTION.

1,398,038. Specification of Letters Patent. Patented Nov. 22, 1921.

Application filed August 11, 1921. Serial No. 491,391.

*To all whom it may concern:*

Be it known that I, THOMAS OLINGER, a citizen of the United States of America, residing at Holland, in the county of Ottawa and State of Michigan, have invented certain new and useful Improvements in Damper Constructions; and I do hereby declare the following to be a full, clear, and exact description of the invention, such as will enable others skilled in the art to which it appertains to make and use the same.

This invention relates to a damper construction, such as is adapted to be used in warm air furnace pipes, though not limited in use thereto. It is a primary object and purpose of the invention to provide a novel damper holding clip which is adjustable so as to take a large number of sizes of dampers for different sizes of pipes, which is particularly easy to assemble, which is rigid so as to form a substantially inflexible axis on which the damper turns in the pipe, which is very readily inserted in the pipe, and which can be manufactured and marketed at comparatively low cost. All of these features, together with many others not specifically stated at this time, will appear as understanding of the invention is had from the following description, taken in connection with the accompanying drawing, in which.

Figure 1 is a perspective view showing the damper disk, parts of the clip used therewith and operating handle for the damper separated from each other.

Fig. 2 is a transverse section through a pipe with my damper construction installed therein.

Fig. 3 is a fragmentary elevation of the tail piece member of the clip, showing the point which passes through one side of the pipe.

Fig. 4 is a transverse section through the handle section of the clip, and looking toward the outer end thereof.

Fig. 5 is a fragmentary perspective view of the outer end of the handle section, showing the assembly of the damper disk and the inner end of the operating handle therewith, and Fig. 6 is a perspective view of the outer end of the handle section of the clip before the same is assembled, and looking at the same from underneath.

Like reference characters refer to like parts in the different figures of the drawing.

In the construction shown, a tail piece member 1 of metal is used, the same being longitudinally dished or grooved centrally for strengthening and reinforcement. At its outer end, two ears 2 are turned back parallel to the body of the member and slightly spaced therefrom, being spaced part and located at the edges of the member. From the end of the member and between the ears, a point 3 projects for a short distance, substantially one inch, though this may be varied. A hole 4 is made through the member 1 a short distance back of the ends of the ears 2, while at the inner portion of the member, a plurality of transverse slots 5 are cut, the same being spaced short distances from each other.

A handle section comprising a length of metal 6 is adapted to be associated with the tail piece member, and it is likewise longitudinally dished or grooved centrally for reinforcement and for nesting engagement with the member 1. At its inner end, it is provided with a pointed tang 7 shaped to pass through any one of the slots 5 in member 1. Adjacent its outer end it has an opening 8 cut therethrough. At the outer end of the handle section, it is turned substantially at right angles for a short distance, making the part 9, and then turned back upon itself to make a second portion 10 which lies against said part 9, thence terminating in an inwardly turned section or ear 11 which is brought under the main body of the handle section, lying at an angle thereto and provided at its free end with a tang 12 turned toward the main body 6 of the handle section and so located that when said ear 11 is bent toward the part 6, the tang 12 will enter the opening at 8. In the parts 9 and 10 openings 13 in conjunction with each other are made, substantially triangular in shape, each being widened, as indicated at 13ᵃ at the end nearest the bar 6. The openings are nearly of an inverted T-shape, one portion thereof being progressively widened from one end to where it joins the other portion lying at right angles thereto.

The handle adapted to be connected with the handle section of the clip comprises a bar 14 of flat metal, the inner end of which is formed with an arrow-shaped head 15, while the outer end is formed with a finger engageable portion 16. A coiled spring 17 is placed around the bar 14, bearing at one end against the portion 16 and at its other end against a flat disk 18 having a central opening for the passage of the bar 14.

The damper disk 19 is a circular disk of thin sheet metal. In assembling the damper disk with the clip parts, the tail piece is applied to the disk, one edge of the disk being inserted between ears 2 and the body of member 1. A rivet, as shown at 22 may be forced through the disk 19 at the hole 4 in the tail piece and headed over to secure the parts together permanently, the point where the rivet passes through disk 19 being indicated in dotted lines at 20. The handle section 6 is then placed against the damper disk and partly over the tail piece member, the opposite edge of the disk coming between the ear 11 and the body of bar 6, and the tang 7 passing through one of the slots 5 and being forced through the damper disk, at the point indicated in dotted lines at 21, the end of the tang being turned back and clenched against the side of the damper disk. The ear 11 may then be bent toward the disk so as to pass tang 12 through it, and into the opening at 8 in the handle section of the clip. The disk 19 being of thin sheet metal, the tangs and rivet are readily forced therethrough without the necessity of punching openings therein in the first instance. The point where tang 12 passes through the disk is shown at 20$^a$.

When thus assembled and connected together, the damper disk with attached clip may be placed in a pipe, such as shown at 23, the point 3 passing freely through an opening 24 in one side of the pipe, while the openings in the parts 9 and 10 come into alinement with a second opening 25 in the pipe diametrically opposite the opening 24 therein. The arrow or spear shaped head 15 of the bar 14 is passed through openings 24 and 13, the handle being so positioned that the head 15 passes freely through the slot or opening 13 lengthwise thereof. After passing therethrough, the handle is turned one-quarter turn to the position shown in Fig. 5, whereupon the head 15 partially seats in the widened portion 13$^a$ of the opening 13, making an interlock therewith, the portion 13$^a$ of the opening not being wide enough to pass the head 15 but wide enough to partly receive it. The disk 18 is pressed against the outer side of the pipe through pressure exerted by spring 17, and the tendency is for the handle bar 14 to move outward under the influence of the spring force, thereby holding head 15 locked in the widened portion 13$^a$ of the opening in part 9, as is evident. By reason of this interlocking connection, turning the handle serves to turn the damper disk 19 while, if desired at any time, the ready disconnection of the handle and removal of the damper from the pipe may be had by merely pressing inwardly on the handle to disconnect the head 15 from the opening at 13$^a$ and then turning the handle so that head 15 may freely pass outwardly through openings 13 and 25.

The constructions described are simple, easily and readily made from sheet metal at low cost, and the damper is particularly effective in service. This follows from the rigid axis made for the damper by the clip structure to which the damper disk is attached. The assembly of the parts is exceptionally easy. One very meritorious feature of the invention resides in the ability to apply the clip to all sizes of damper disks, one size only of clip being manufactured for the many different sizes of dampers needed for the different sizes of pipes.

I claim:

1. In combination, a damper disk, a tail piece member having a pointed extension at one end connected to the disk, a handle member attached to the disk in alinement with and partly covering the tail piece member, a handle, and means for detachably connecting the handle to the outer end of the handle member.

2. In combination, a circular damper disk, a bar of flat metal located against one side of the disk and secured thereto, said bar at its outer end having a pointed extension, and provided at its inner portion with a plurality of spaced apart slotted openings therethrough, said disk having a similar opening adapted to register with one of said openings in the bar, a handle member comprising a bar located against the disk and partly over the slotted end of the first bar, a tang on the inner end of said handle member passing through the alined slots in the first bar and disk and bent over after passing therethrough, a handle, and means for detachably connecting the handle to the outer end of the handle member.

3. In combination, a circular damper disk, a bar of flat metal formed at one end with backwardly turned ears and a pointed extension projecting outwardly from between the ears, said disk at one edge passing between the bar and said ears, means for permanently securing the bar to the disk, a second bar comprising a handle section formed at its inner end with a tang turned at right angles to the length of the bar and at its other end with an oppositely turned portion at right angles to the length of the bar, said portion being again turned backward substantially parallel to the first portion and terminating in a rearwardly bent ear paralleling the length of the bar, said bar lying against the damper disk and partly over the first bar with the edge of said disk passing under the ear, and said tang passing through the first bar and the disk and being clenched against the disk, substantially as described.

4. In combination, a bar formed with reversely turned ears paralleling the length of the bar and a pointed extension at one end of the bar, and with a plurality of transverse slots adjacent the opposite end of the bar, and a second bar of similar cross section formed at one end with a tang turned at right angles to the length of the bar and at its opposite end is formed with means for the detachable connection of an operating handle, said bars being adapted for connection to a damper disk of any one of a plurality of sizes between two limits in size, with said tang passed through one of the slots in the first bar and through the disk, substantially as described.

5. In combination, a circular damper disk, two bars located against one side of the disk and adjustable toward and over each other to conform to the size of the disk, means at the outer end of each bar to engage with the disk at opposite edges, means for connecting the bars together and to the disk, a pointed extension at one end of one of the bars extending away from the disk, and means at the opposite end of the other bar for detachably connecting an operating handle thereto, substantially as described.

6. A damper clip comprising two bars adapted to be located one partly over the other and in substantial alinement against a damper disk of any one of a plurality of sizes between two extreme dimensions, means on the outer ends of the bars for engaging with opposite edges of the disk, and means on one of the bars at its inner end for passing through the other bar and through the disk to connect the bars and disk together.

7. In combination with a pipe having circular cross section and openings in opposite sides thereof, a circular damper disk located within the pipe, a sheet metal bar attached to the disk and at one end having a pointed extension passing through one opening in the pipe, at its other end having a portion bent at right angles to the length of the bar and then back upon itself, said portions having substantially inverted T-shaped alined openings therethrough, a handle bar formed at its inner end with an arrow shaped head passed through the other opening in the pipe and through the openings in said portions of the bar and then turned to seat in the narrower portions of said openings, said bar at its outer end being provided with a finger engageable part, a disk on said bar adapted to press against the pipe, and a coiled spring under compression between the disk and said outer part of the handle bar, substantially as described.

8. In combination, a damper disk, a bar provided at its outer end with a pointed extension located against and extending partly across the disk, means permanently securing the bar to the disk, a second bar located against the disk and partly over the first bar, formed at its outer end with a portion turned at right angles to the length of the bar and a second portion turned back parallel to the first portion, said portions having alined openings therethrough, the opening in said first portion comprising two parts, one of inverted V-shape and the other of elongated narrow shape located at the wider end of the first part, and means permanently securing the second bar to the disk.

9. In combination a damper disk, a bar provided at its outer end with a pointed extension and backwardly turned ears located against and partly across the disk, the edge of the disk passing between the ears and adjacent portion of the bar, a second bar located against the disk and partly over the first bar and formed at its outer end with a portion turned at right angles to the length of the bar and a second portion turned back parallel to the first portion, said second portion terminating in an ear bent back under the end of said second bar and between which and the bar the opposite edge of the disk passes, said portions at the outer end of the second bar having openings for the passage and detachable seating of an operating handle, and a tang on the inner end of the second bar turned at right angles and passing through the first bar and the disk and turned against the disk, substantially as described.

10. A damper clip for mounting a damper in a pipe, comprising two bars adapted to be located in alinement and one partly over the other, means for connecting said bars to any one of a plurality of sizes of damper disks, a pointed extension at the outer end of one of said bars, and means at the outer end of the other of said bars for detachably connecting an operating handle thereto through the pipe in which the damper is located.

In testimony whereof I affix my signature.

THOMAS OLINGER.